United States Patent
Gussack et al.

[15] 3,677,594
[45] July 18, 1972

[54] BUMPER GUARD MOUNTING ASSEMBLY

[72] Inventors: Seymour I. Gussack, New Rochelle; Hugh Berry, Scarsdale, both of N.Y.

[73] Assignee: X-L-O Automotive Accessories, Inc., West Nyack, N.Y.

[22] Filed: Nov. 12, 1970

[21] Appl. No.: 88,794

[52] U.S. Cl. .................................293/67, 293/71, 293/99
[51] Int. Cl. ................B60r 19/04, B60r 19/08, B61f 19/04
[58] Field of Search .................293/64, 65, 66, 67, 71 R, 99

[56] References Cited

UNITED STATES PATENTS 2,250,565  7/1941  Bahr ..........................................293/65
3,226,145  12/1965  Goldberg ...................................293/65
2,730,396  1/1956  Johnson ...................................293/66 X
2,769,653  11/1956  Lazan, Jr. ...............................293/65 X Primary Examiner—Arthur L. La Point
Assistant Examiner—Howard Beltram
Attorney—Charles E. Temko

[57] ABSTRACT

An automotive bumper overrider guard adapted to be pushed onto an automotive bumper, and tightened in place through an access opening on an exposed outer surface thereof, the access opening being subsequently closed by a protective and/or decorative cap.

2 Claims, 2 Drawing Figures

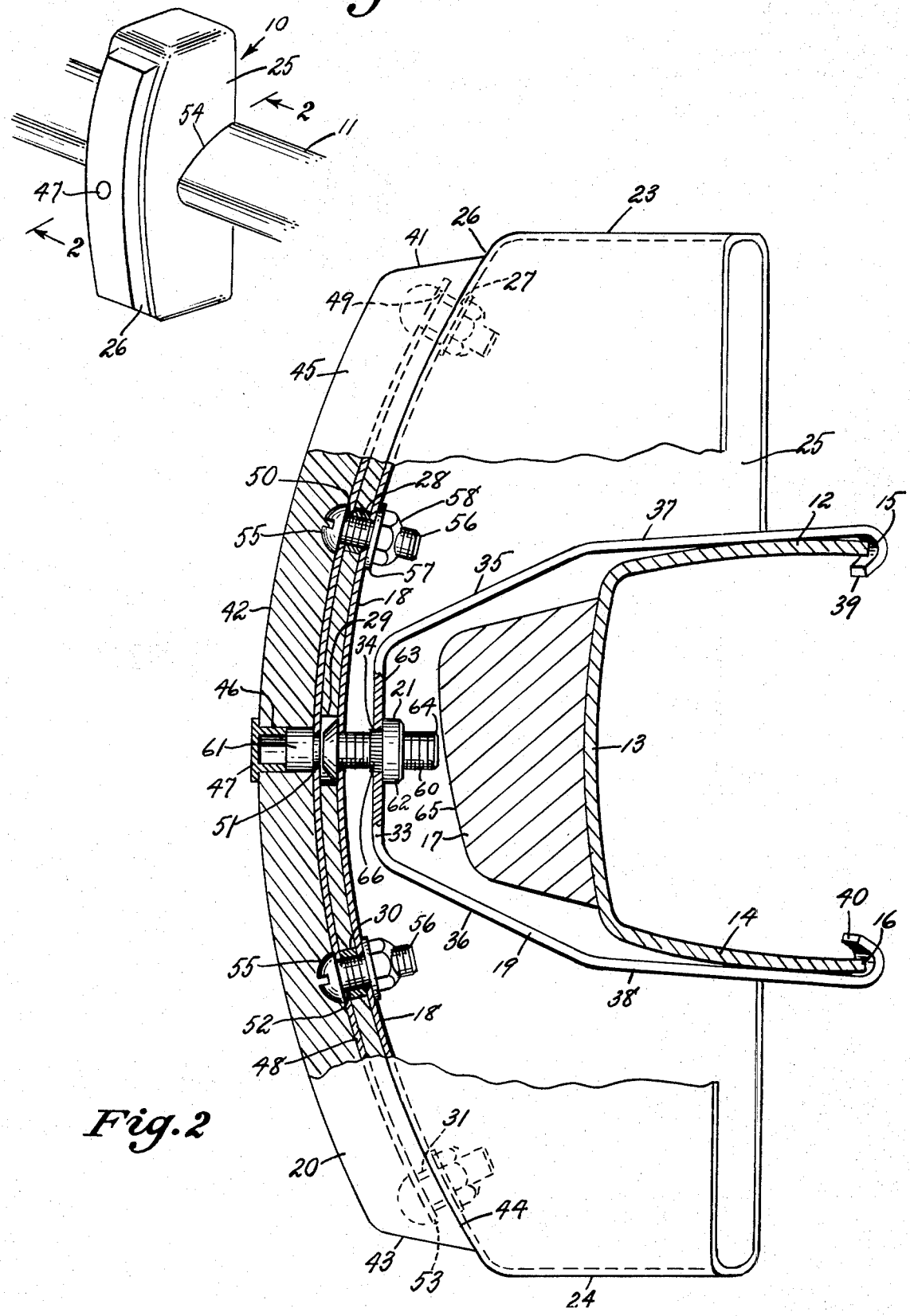

BUMPER GUARD MOUNTING ASSEMBLY

This invention relates generally to the field of bumper overriders of supplemental type adapted to be mounted upon the normal bumpers of automobiles in order to raise the effective height of the same to correspond to those of other bumpers with which the automobile is likely to come into contact. While not specifically limited to such use, the invention has particular application for use in conjunction with the bumpers of imported cars in which the normal bumper height is below that of domestically manufactured automobiles, so as to afford additional protection against damage resulting from contact therebetween. Overrider devices of this general type are known in the art, and the invention lies in specific instructional details permitting improved ease of installation. Prior art devices have been fastened by bolting through the bumper, or bolting in place from behind the bumper, a location which affords only limited and relatively awkward access.

It is therefore among the principal objects of the present invention to provide an improved overrider which may be conveniently installed by merely pushing the same onto the bumper to be engaged by a retaining strap having hooked ends thereon, and subsequently tightening this engagement by rotating a single screw, access to which is provided through an opening in a forwardly positioned surface thereof.

Another object of the invention lies in the provision of an improved overrider construction possessed of the above advantage, in which the access opening to the above mentioned screw may be attractively concealed after installation has been completed.

Yet another object of the invention lies in the provision of an improved automotive bumper overrider, in which the cost of fabrication may be of a reasonably low order, directly comparable with existing prior art devices, thereby permitting consequent wide sale, distribution, and use.

These objects, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

FIG. 1 is a fragmentary view in perspective of an embodiment of the invention.

FIG. 2 is an enlarged transverse central sectional view thereof.

In accordance with the invention, the device, an overrider guard, generally indicated by reference character 10, is illustrated in the drawing in interconnected relation with a conventional automotive bumper 11. The bumper is of C-shaped cross-section, including an upper wall 12, an outer wall 13, and a lower wall 14, although, it is to be understood that the device may be also employed in conjunction with bumpers of relatively flatter cross-section. The bumper 11 is bounded by upper and lower edges 15 and 16, respectively, and may be optionally provided with a rubber bumper guard 17, as is known in the art.

The device 10, an overrider guard, comprises broadly a base element 18, a mounting support or strip element 19, an externally positioned bumper element 20, and a tensioning element 21.

The base element 18 is preferably made as a metallic deep drawing, to include an upper wall 23, a lower wall 24, side walls 25, and a front curved wall 26. The wall 26 is provided with upper screw holes 27 and 28, a centrally disposed hole 29, and lower screw holes 30 and 31.

The strap element 19 may be formed as a metallic stamping, and includes a centrally disposed portion 33 having a bore 34 therein, interconnected to upper and lower converging portions 35 and 36, respectively. The portions 35 and 36 in turn are interconnected with rearwardly extending portions 37 and 38 terminating in hook portions 39 and 40. As the element 19 possesses a limited degree of resiliency, during installation, it is possible to push the hook portions against the outer surface of the bumper 11 to spread the same so that the hook portions may engage the edges 15 and 16.

The bumper element 20 is preferably formed as an insert molding from natural or synthetic rubbers, or other suitable synthetic resinous materials. It is bounded by an upper surface 41, a forward surface 42, a lower surface 43, an inner surface 44, and side surfaces, one of which is indicated by reference character 45. Extending between the forward surface 42 and the inner surface 44 is a centrally disposed bore 46 selectively fitted with a plug 47 which closes the bore to prevent the entry of dirt and water, as well as to afford an attractive appearance. Molded integrally within the body of the bumper element 20 is an elongated metallic strip 48 having holes 49, 50, 51, 52, and 53. The hole 51 overlies the bore 46. Screws 55, the exposed shanks 56 of which penetrate holes 27, 28, 30, and 31 in the base element 18. Washers 57 and nuts 58 interconnect the bumper element 20 with the base element 18 in well known manner.

The tensioning element 21 includes an elongated bolt or screw 60, the head 61 of which is accessible through the central bore 46. It penetrates the central bore 29, and threadedly engages a nut 62 abutting the inner surface 63 of the central portion 33 of the strap element 19.

Installation of the device 10 upon the bumper 11 is simply a matter of backing off the screw or bolt 60 with respect to the nut 62, and moving the strap element 19 against the bumper 11 to spread the hook portions 38 and 39 till they pass over the edges 15 and 16, as shown in FIG. 2. The screw or bolt 60 may then be tightened through the bore 46, the serrated flange 66 on the nut 62 preventing rotation of the same with respect to the hole 34. With continued rotation of the screw or bolt 60, the strap element will be drawn leftwardly as seen in the drawing, to tighten the same against the edges of the bumper, as the cut out portion 54 (FIG. 1) engages the outer surface of the bumper, to securely lock the device thereon. The plug 47 may then be inserted within the bore 46 to complete installation. Normally, oxidation building up on the surface of the bolt or screw 60 will retain the adjustment, but should further tightening be required, the plug may be removed for this purpose, and reinserted after adjustment has been made.

We wish it to be understood that we do not consider the invention limited to the precise details of structure shown and set forth in this specification, for obvious modifications will occur to those skilled in the art to which the invention pertains.

We claim:

1. An automotive bumper overrider guard comprising: a base element, a mounting strap element carried by said base element on an inner surface thereof, medially of the length of said strap element, said strap element having upper and lower terminals forming hooked means adapted to engage corresponding upper and lower edges on a bumper; screw means having a head engaging an opening in said base element to be accessible outwardly of said base element, and means treadedly engaging said screw means and bearing against said strap element to move said strap element toward said base element whereby to engage an inwardly facing surface of said base element with an outwardly disposed surface of said bumper.

2. Structure in accordance with claim 1, including shockabsorbing means carried on an outer surface of said base member, said shock absorbing means having a bore therein overlying said head of said screw means, and plug means insertable in said bore to conceal said screw means.

* * * * *